United States Patent [19]

Sheynblat

[11] Patent Number: 6,018,818
[45] Date of Patent: Jan. 25, 2000

[54] HIGH LEVEL TESTING TO TEST AND RECOVER THE DAMAGED DIFFERENTIAL CORRECTIONS

[75] Inventor: Leonid Sheynblat, Belmont, Calif.

[73] Assignee: Trimble Navigation Limited, Sunnyvale, Calif.

[21] Appl. No.: 08/943,307

[22] Filed: Oct. 14, 1997

Related U.S. Application Data

[62] Division of application No. 08/435,552, May 5, 1995, Pat. No. 5,748,651.

[51] Int. Cl.$^7$ .............................. H04L 1/00; G06F 165/00
[52] U.S. Cl. ............................................. 714/811; 701/215
[58] Field of Search .............................. 714/811; 701/215

[56] References Cited

U.S. PATENT DOCUMENTS

| | | | |
|---|---|---|---|
| 5,202,829 | 4/1993 | Geier ........................................ | 364/449 |
| 5,436,632 | 7/1995 | Sheynblat ................................ | 342/357 |
| 5,450,448 | 9/1995 | Sheynblat ................................ | 375/346 |
| 5,477,458 | 12/1995 | Loomis .................................... | 364/449 |
| 5,596,328 | 1/1997 | Stangeland .............................. | 342/357 |
| 5,610,616 | 3/1997 | Vallot et al. ............................. | 342/357 |
| 5,748,651 | 5/1998 | Sheynblat ................................ | 371/49.1 |

OTHER PUBLICATIONS

Spalding et al., "Differential GPS Integrity Monitor", IEEE Position Location and Navigation Symposium, Apr. 1994, pp. 225–232.

*Primary Examiner*—Stephen M. Baker
*Attorney, Agent, or Firm*—Boris G. Tankhilevich

[57] ABSTRACT

The method and apparatus for high level testing are disclosed. The high level testing is used to test and recover the damaged differential corrections. The high level test measures the Correction Quality Indicator (CQI) and is based on the information included in the current pseudorange correction (PRC), in the previous range rate correction (RRC), and in the previous PRC projected to a time tag of a current PRC. The method computes CQI and compares the computed CQI value with the threshold value T(FAR), wherein the T(FAR) is the threshold value based on a false alarm rate and confidence interval. If the CQI does not exceed the threshold value T(FAR) the corrections for the tested satellite or a combination of tested satellites are marked as valid for further use in the user receiver differential solution.

2 Claims, 9 Drawing Sheets

HIGH LEVEL TESTING TO TEST AND RECOVER THE DAMAGED DIFFERENTIAL CORRECTIONS

BACKGROUND

This is a divisional U.S. patent application of the parent U.S. patent application Ser. No. 08/435,552 filed on May 5, 1995, now U.S. Pat. No. 5,748,651.

The global positioning system (GPS) is a United States flnded satellite system consisting of twenty four satellites in a constellation that beams highly accurate timed signals to earth. There are other satellite systems which can be used for the same purposes. For instance, the GLONASS satellite system maintained by Russia also beams the accurately timed signals to earth. The generic term used for designation of any possible satellite positioning system is a satellite positioning system (SATPS).

With differential GPS, a stationary reference receiver is placed at a very accurately known point location. The reference receiver generates corrections which are sent to a transmitter, which in turn broadcasts the corrections to users within the area of the transmission broadcast. A differential GPS user receives these corrections through a radio/modem and applies them to the direct GPS measurements. This gives the user a position measurement of very high accuracy, e.g., from one meter to ten meters. Differential GPS works quite well to produce meter-level accurate navigation as far as 100 kilometers from the reference station. Most radiolocation and radionavigation systems can be operated in a differential mode, and consequently provide improved accuracy. The features of continuous service, high effective update rate, and potentially large coverage areas make it possible for differential GPS to provide "real-time" positional information that could be obtained previously only in a "post-processing" mode of operation. This combination of capabilities of differential GPS makes it very attractive for a variety of applications. As the price of receivers falls to the level of competing systems, many users will choose GPS. The differential GPS finds application in the Marine Navigation. Indeed, the ability of GPS/GLONASS to provide global coverage with an accuracy of 100 meters is expected to make it very attractive to ships that sail in international waters. Even without differential operation, the navigation service is adequate for oceanic and coastal marine operations. The Federal Radionavigation Plan (FRP) cites the requirements for oceanic and coastal navigation accuracy as 400 meters. However, in the restricted channels of some harbors and inland waterways 8–10 meters accuracy is required and the utilization of the differential GPS is essential to meet this requirement.

Inland waterway navigation, such as along the St. Lawrence Seaway, could benefit considerably from differential GPS service. In addition to providing guidance during periods of low visibility, it may prove possible to extend the period of safe passage by several weeks.

For Air Navigation, the Precision Landing requires highly accurate vertical guidance (0.4 meters, 2-sigma), as well as accurate lateral guidance (4–9 meters, 2-sigma) that may be achieved by employing the differential GPS system. Another application would be agricultural operations such as crop spraying that often takes place at night. The pilot flies close to the ground using flagmen to provide visual reference. Deferential GPS could provide the aircraft with accurate guidance along the desired tracks.

The differential GPS used in Land Navigation can provide a user with the capability to distinguish the particular home or building. The differential GPS can be used for Marine Surveying applications such as oil and natural gas exploration of the ocean floor. There are many phases to oil and gas exploration which require position fixes. They are: exploration, appraisal drilling, acoustic device positioning, field development, post-production, and geodetic control.

The land surveys by using the differential GPS systems can obtain real-time, high-accuracy position fixes, so that highway surveying, cadastral surveying, and geodetic surveying techniques can be greatly simplified.

The U.S. Census Bureau is interested in using the differential GPS technique to identify township and county boundaries, and to locate homes that are off identified roads or which do not have addresses. The accuracy requirement have been estimated as 5–50 meters.

There is a general problem relating to all differential GPS receivers that is addressed in the present invention. The differences between the received and expected values are transmitted from the Reference Station to the GPS receiver over a separate communication link to correct the GPS receiver pseudorange measurements before the fix is computed. During the atmospheric noise, lightning, storms, weather anomalies, or electromagnetic interference the messages transmitted from the Reference Station to the GPS receiver can be damaged. Also, some differential GPS systems do not allow the use of error correction codes to correct the data errors resulting from the imperfect data transmission from the Reference Station to the GPS receiver. For instance, the Radio Technical Commission for Maritime Services (RTCM) doesn't recommend to use the self-correction code because it would increase the bandwidth required for the transmission.

What is needed is a high level testing of the damaged differential corrections which would allow one to test and recover the damaged differential corrections.

SUMMARY

The present invention is unique because it provides a method and apparatus to test and recover certain damaged differential corrections.

One aspect of the present invention is directed to a method of high level testing of the differential corrections. The high level test measures the Correction Quality Indicator (CQI), and is based on the information included in the current pseudorange correction (PRC), in the previous range rate correction (RRC), and in the previous PRC projected to a time tag of a current PRC. wherein t1 is synchronized with the Modified Z-Count for a PRC which was generated at t1. t2 is the Modified Z-Count of the current correction received for that satellite. The Modified Z-Count is defined as the time of the start of the frame as well as the reference time for the message parameters. The Modified Z-Count provides the time into the hour (0 through 3599.4 seconds) and is sent in units of 0.6 seconds.

In one embodiment, the method comprises the following steps: (1) computing $CQI=PRC_{t2}-[PRC_{t1}+RRC_{t1}*(t2-t1)]$; and (2) comparing the computed CQI value with the threshold value T(FAR). The T(FAR) is the threshold value based on a false alarm rate and confidence interval. If the CQI exceeds the threshold value T(FAR) then a failure is declared and the corrections for the tested satellite or a combination of tested satellites are marked as invalid for further use in the user receiver differential solution.

Another aspect of the present invention is directed to a method of high level testing of the differential corrections, wherein the test measures the Trimble Correction Quality Indicator (TCQI). The test is based on the information included in the current pseudorange corrections (PRC) and in the current range rate correction (RRC) projected backward to some time t3=(t1+t2)/2. This test is also based on the information included in the previous PRC and RRC projected forward to the time t3. t1 is synchronized with the Modified Z-Count for a PRC which was generated at t1, and t2 is the Modified Z-Count of the current correction received for that satellite. TCQI is valid in the middle t3 of the interval defined by the Modified Z-Counts t2 and t1. However, the TCQI can be defined at any instant (tn) between t1 and t2. The method uses all of the correction data included in two consecutive messages for a particular satellite.

In one embodiment, the method comprises the following steps: (1) computing a TCQI value: TCQI=$PRC_{t2}-RRC_{t2}*(t2-t1)/2-[PRC_{t1}+RRC_{t1}*(t2-t1)/2]$; and (2) comparing the computed TCQI value with the threshold value T(FAR). If the TCQI exceeds the threshold value T(FAR) then again failure is declared and the corrections for the tested satellite or a combination of tested satellites are marked as invalid.

Additional aspect of the present invention is directed to an apparatus for partial decoding the damaged messages in the differential mode of operation of a Reference Station (RefSta), wherein the RefSta generates differential messages and transmits them to the remote user. The apparatus comprises at least one partial message decoder for decoding the encoded data transmitted by the RefSta, a differential satellite positioning system (SATPS) receiver, and a communication link connecting the partial message decoder and the SATPS receiver. The SATPS receiver receives the raw positioning data from the SATPS and receives the partially decoded differential corrections from at least one partial message decoder for improving the raw positioning data transmitted by the SATPS.

In one embodiment, the RefSta can transmit an RTCM1 message and the partial message decoder includes a partial RTCM1 decoder.

In another embodiment, the RefSta transmits an RTCM2 message and the partial message decoder comprises a partial RTCM2 decoder.

In one more embodiment, the RefSta transmits an RTCM9 message and the partial message decoder comprises a partial RTCM9 decoder.

In one additional embodiment, the RefSta transmits a GLONASS RTCM message, and the partial message decoder further includes a partial GLONASS decoder.

FULL DESCRIPTION OF THE PREFERRED EMBODIMENT

Figure 1:
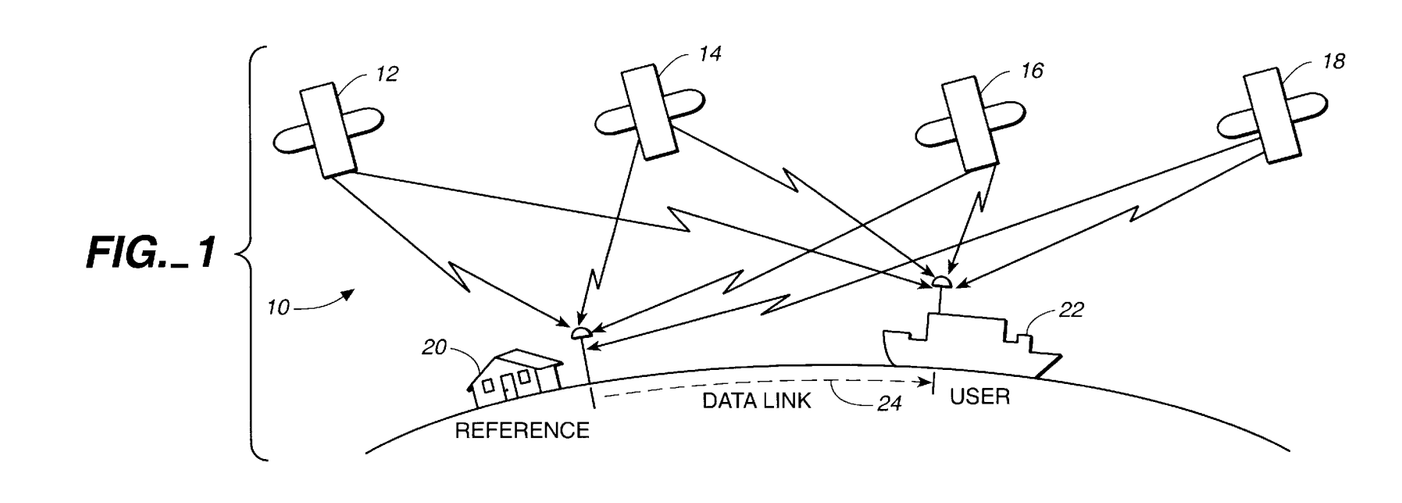
FIG. 1 illustrates the differential GPS geometry.
Figure 2:
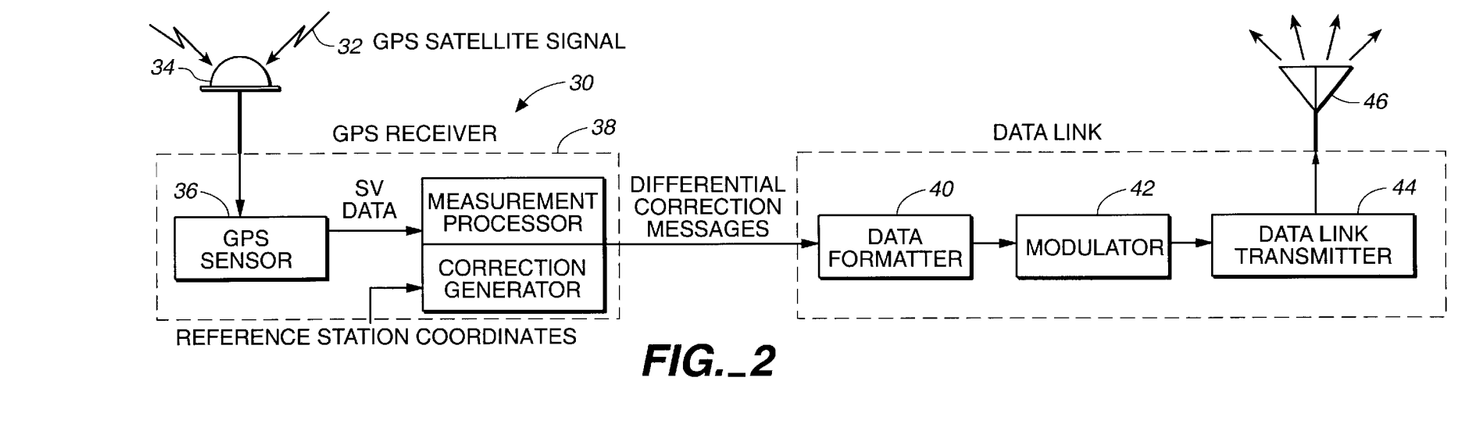
FIG. 2 depicts a Reference Station block diagram.

FIG. 1 illustrates the differential GPS geometry 10. The satellites 12, 14, 16, and 18 provide the satellite signals which are received by the differential Reference Station (RefSta) 20 and by the user receiver 22. The datalink 24 allows to transmit the differential corrections to the user that can calculate its position location with an improved accuracy. FIG. 2 depicts the block diagram 30 of the RefSta. The RefSta consists of a GPS sensor 36 with antenna 34, a data processor 38, a data link transmitter 44 with antenna 46, and interfacing equipment like data formatter 40 and modulator 42. The GPS receiver antenna is carefully surveyed to determine its phase center position. The ideal RefSta receiver 36 has 24 parallel channels that allow to continuously receive signals from all satellites in view.

Figure 3:
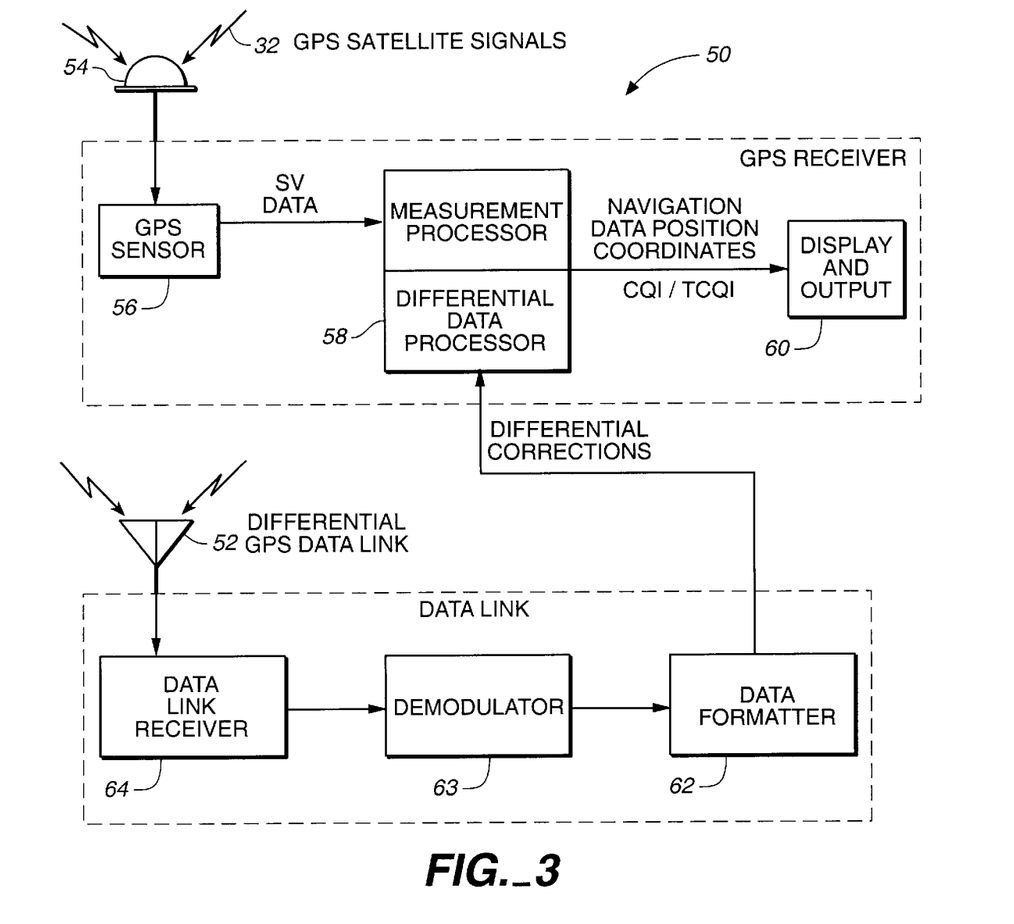
FIG. 3 shows a user equipment block diagram

The user equipment is shown in FIG. 3. It consists of a GPS sensor 56 with antenna 54, a data processor 58, a data link receiver 64 with antenna 52, and interfacing equipment. The data processor applies the corrections received from the RefSta to the pseudorange and pseudorange rate data measured by the user receiver.

For each satellite employed by the user receiver, the correction obtained from the RefSta is added to the pseudorange measurement. The pseudorange correction itself is derived from the pseudorange and range rate corrections, adjusted to account for the time elapsed between the time of generation of the corrections and the time of the user pseudorange measurement, as follows:

$$PRC(t)=PRC(t(0))+(RRC(t(0))*(t-t(0)));$$

where PRC(t) is the correction to be applied, PRC(t(0)) is the pseudorange correction from the message, RRC(t(0)) is the range-rate correction from the message, t(0) is the reference time of the correction, and t is the time associated with the pseudorange measurement, or the time of the position fix (could be different from time of measurement).

In the differential mode of operation a Reference Station (Refcta) generates the differential messages and transmits them to the remote user. The following discussion is applicable to all differential message formats with the emphasis on the Radio Technical Commission for Maritime Services (RTCM) Special Committee No. 104.

To date there are 64 message types defined, either tentatively or in final fixed form, retired or reserved. See RTCM Recommended Standards for Differential NAVSTAR GPS Service, Version 2.1, Published in Jan. 3, 1994 by RTCM, 655 Fifteenth St, NW, Suite 300, Washington, D.C. 20005, USA, that is incorporated herein by reference. The RTCM SC-104 standard defines the message formats and recommends on the user interface protocol, which allows a receiver to be used with a radiobeacon link or any other link.

Message 1 transmits the differential GPS Corrections, message 2-Delta differential GPS Corrections, message 3-RefSta parameters, message 4-Surveying, message 5-Constellation Health, message 6-Null Frame, message 9-High Rate differential GPS Corrections, and so on. The messages are transmitted continuously with Message Type 6, Null Frame, used as a transmission fill, if the Reference Station has no other messages ready to send.

Figure 4:
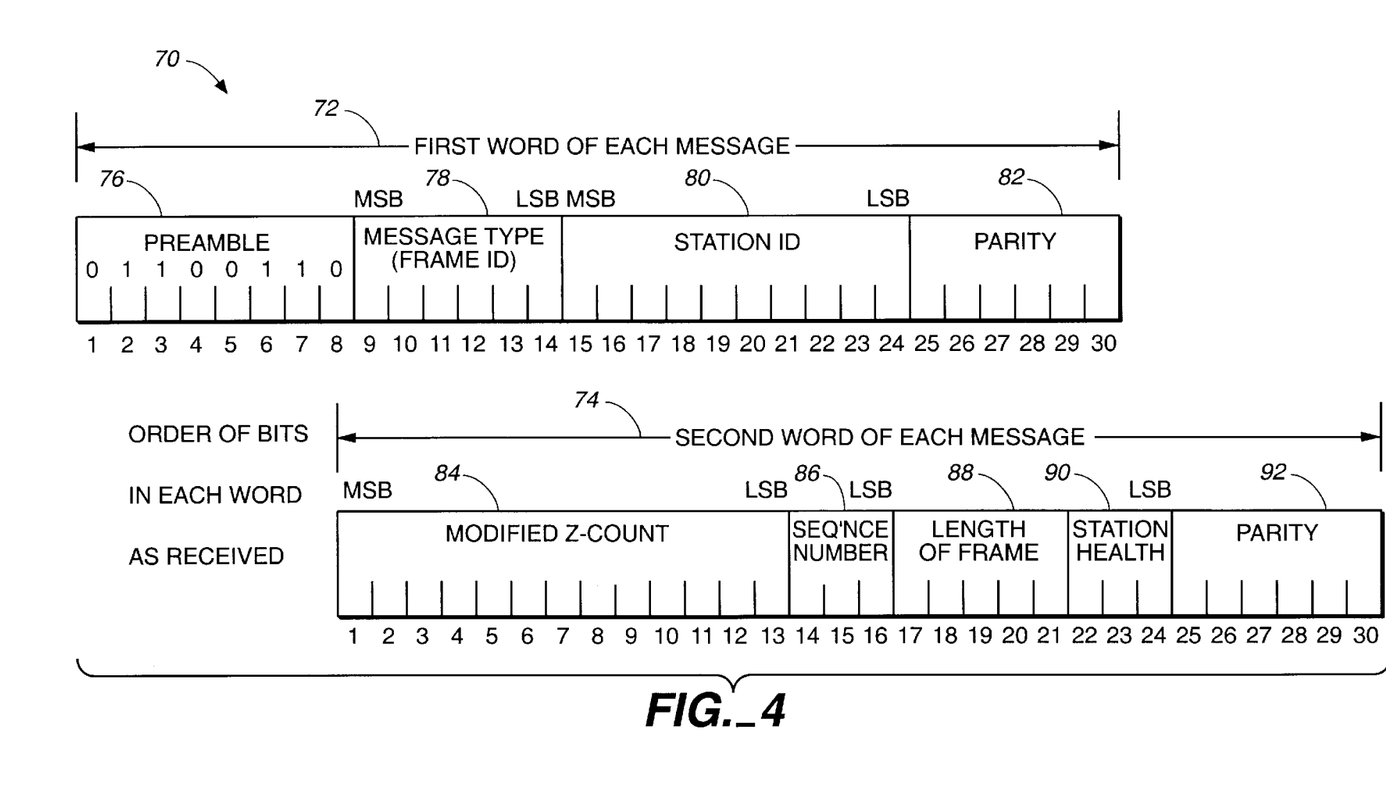
FIG. 4 is an illustration of a 2-word header for all messages.

The header format 70 of the messages is illustrated in FIG. 4 with shows the first two thirty-bit words of each frame or message type. Each frame is N+2 words long, wherein N is an integer. N words include the data of the message. The word size and a parity algorithm are identical to that of the GPS navigation message as described in the document ICD-GPS-200 [NAVSTAR GPS/JPO, 1983], which is incorporated herein by reference.

Thus, the RTCM message format has 30 bit words (fixed size for GPS/GLONASS) (24 data and 6 parity bits) and utilizes GPS message parity algorithm. The RTCM message format, however, includes the variable frame length message format, whereas the GPS/GLONASS navigation data format has fixed length subframes.

Each message comprises a two-word header followed by the data words. The message length varies with the message type as well as within the message type. Assuming 2 words per satellite (for Message Types 18 through 21) and a 24 satellite GPS constellation, the maximum message length comes to 50 words.

The first two words of each message include data that is pertinent to any type of message: Reference Station ID information 80, time of message in Modified Z-Count 84, and PREAMBLE information required for message synchronization. The Modified Z-Count is different from the GPS Z-Count in that the least significant bit (LSB) has a scale factor of 0.6 seconds instead of 6 seconds, and the range of the Z-count is only one hour in order to conserve bits. The reasoning behind this is that all differential GPS users will have already initialized via the GPS system and will know what the GPS time is.

Message synchronization is achieved by user searching for a fixed 8-bit PREAMBLE 76 in the beginning of the first word 72. For instance, the RTCM Version 2.1 PREAMBLE is defined as 66Hex ($102_{10}$).

Once the PREAMBLE is encountered, the decoding algorithm checks the parity of the first header word (see the parent patent application Ser. No. 08/435,552 filed on May 5, 1995 and incorporated by reference herein in its entirety). If the first header word fails the parity test, it is assumed that the PREAMBLE bits were encountered by chance, and the search continues. For any algorithm to proceed with message decoding, the very first word of any message has to pass the parity test. The second header word also should pass the parity check, because it provides the length of message, which is important for partial decode rule.

Figure 5:
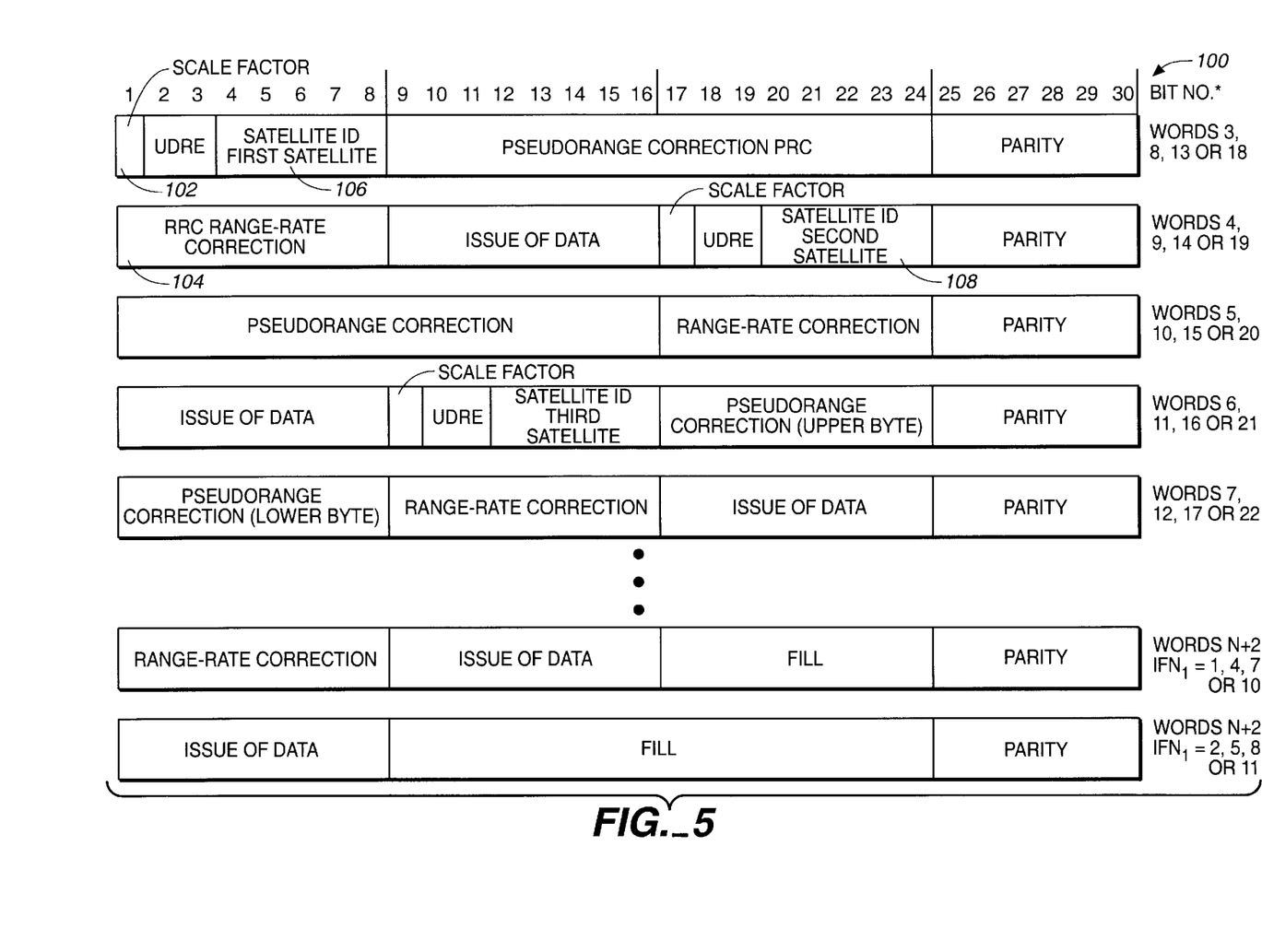
FIG. 5 shows a type 1 or type 9 message format.

FIG. 5 depicts type 1 and/or type 9 message formats that carry the differential corrections. This is the primary message type which provides the pseudorange correction PRC(t) for any time "t":

$$PRC(t)=PRC(t(0))+(RRC(t(0))*(t-t(0)));$$

where PRC(t(0)) is the 16 bit pseudorange correction, RRC (t(0)) is the 8-bit rate of change of the pseudorange correction (range rate correction), and t(0) is the 13-bit modified Z-Count of the second word. The pseudorange measured by the user (PRM(t)) is then corrected as follows:

$$PR(t)=PRM(t)+PRC(t);$$

where PR(t) is the differentially corrected pseudorange measurement that should be processed by the user equipment navigation filter.

Figure 6:
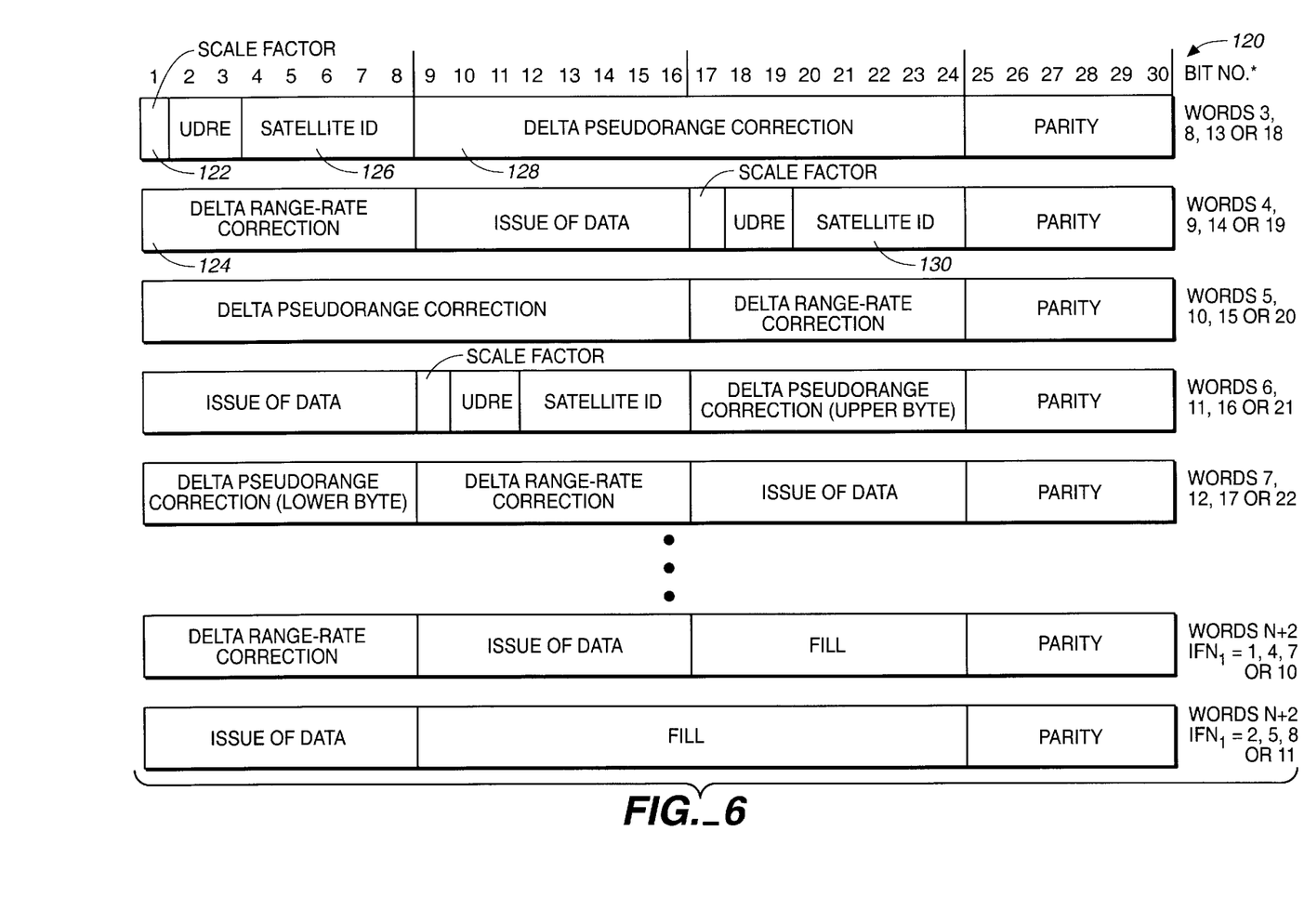
FIG. 6 is a depiction of a type 2 message format.

The data transmitted for any single satellite is spread through two data words. Thus, for the type 1 message data corresponding to the satellite No. 1 (106) is carried by the first data word 102 and by the part of the second data word 104, wherein the data sent for the satellite No. 2 (108) starts in the second data word 104 (see FIG. 5). The same is true for the message type 2 that carries the delta differential corrections (see FIG. 6) and message type 9. The format is such that 5 data words include complete information for 3 satellites.

The message transmitted from the RefSta to a GPS/GLONASS user can get hit during transmission because of the atmospheric noise, lightning, storms, other weather anomalies, or electromagnetic interference. The self-corrected codes are not allowed to be used by some differential GPS systems. For instance, the Radio Technical Commission for Maritime services (RTCM) doesn't recommend to use the self-correction code because it would increase the bandwidth required for the transmission. Thus, there is a need to develop the partial decode algorithm that would allow to salvage at least some information included in the hit message.

Provided that the RefSta is generating differential pseudorange corrections PRCs and range rate corrections RRCs that are independent of the set of satellites used in the correction computation process (i.e., corrections do not "step" or "jump" when the satellite constellation switches), the partial decode algorithm can be applied at the remote station receiving differential corrections. The partial decode algorithm describes a method of checking a partially damaged message using a parity mechanism. This algorithm can be used by a differential satellite positioning system (DSATPS), wherein the partially damaged message is received by a rover. The method allows to recover data included in the damaged message. Each message includes a plurality of words including a header and a plurality of data words following the header. The header includes a first header word and a second header word. The first header word includes a specific PREAMBLE field and the second header word provides the message frame length information.

The "pass"/"fail" information (see the parent patent application Ser. No. 08/435,552 filed on May 5, 1995) is used at the higher level integrity testing of the differential corrections. If there is no confidence in the differential data because some of the words in the particular message were identified as the "hit" words, than there is a need for integrity check of the differential data for the satellite in question. Even if there is a confidence in the differential data because the words in the current message satisfy the parity tests, there is still a need for the integrity check because the differential corrections might not be generated correctly in the first place by the particular RefSta.

Figure 7A:
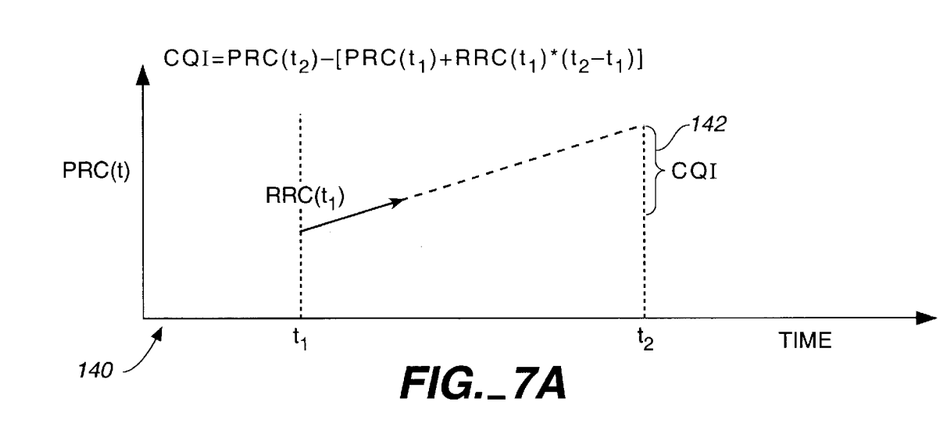
FIG. 7A is a graphical illustration of the Correction Quality Indicator (CQI).

Tests are based on the information included in the previous and current corrections. There are several possible implementations of the test logic. In one embodiment, the test measures the Correction Quality Indicator (CQI). This test is based on the information included in the current pseudorange correction (PRC) and in the previous PRC projected with previous range rate correction (RRC) to a time tag of a current pseudorange correction. Time t1 is synchronized with the Modified Z-Count for a PRC which was generated at t1. Time t2 is the Modified Z-Count of the current correction received for the tested satellite (or tested RefSta). The Modified Z-Count is defined as the time of the start of the frame as well as the reference time for the message parameters and provides the time into the hour (0 through 3599.4 seconds) and is sent in units of 0.6 seconds. The CQI test (see FIG. 7A) comprises the steps of computing CQI:

$$CQI=PRC_{t2}-[PRC_{t1}+RRC_{t1}*(t2-t1)];$$

and comparing the computed CQI value with the threshold value T(FAR). The T(FAR) is the threshold value based on a false alarm rate and on a confidence interval. If the current CQI exceeds the threshold value T(FAR) then a failure is declared and the corrections for the tested satellite (or a combination of tested satellites) are marked as invalid for further use in the user receiver differential solution.

Figure 7B:
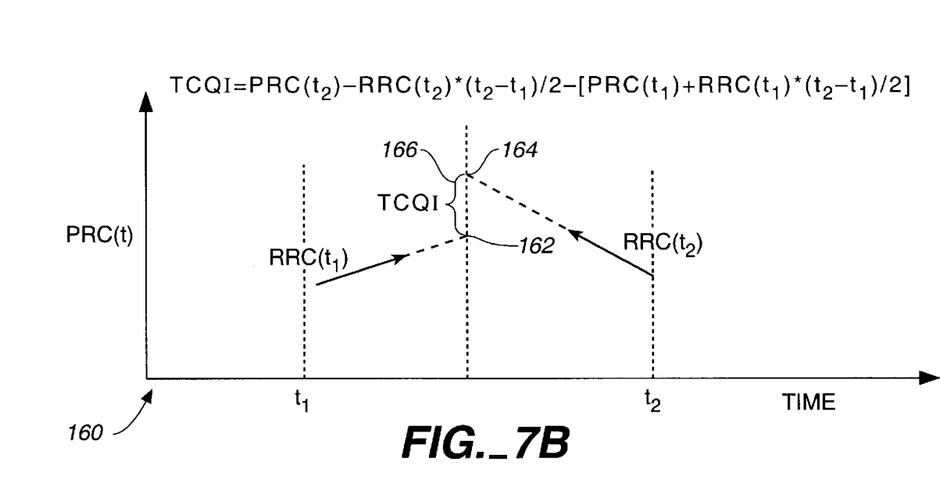
FIG. 7B is a depiction of the Trimble Correction Quality Indicator (TCQI).

In another embodiment, the test measures the Trimble Correction Quality Indicator (TCQI). The Trimble test is based on the information included in the current pseudorange corrections (PRC), and in the current range rate correction (RRC) interpolated to some time t3=(t1+t2)/2. Time t1 is synchronized with the Modified Z-Count for a PRC which was generated at t1. Time t2 is the Modified Z-Count of the current correction received for the tested satellite (or RefSta). The Trimble test is also based on the information included in the previous PRC and RRC interpolated forward to time t3, wherein t3 can be defined anywhere between t1 and t2. Thus, the TCQI result is valid at time t3 in the middle of the interval defined by the Modified Z-Counts t2 and t1. The method uses all of the correction data included in two consecutive messages for a particular tested satellite (or RefSta). The TCQI test (see FIG. 7B) method comprises the steps of computing a TCQI value:

$$TCQI=PRC_{r2}-RRC_{r2}*(t2-t1)/2-[PRC_{r1}+RRC_{r1}*(t2-t1)/2];$$

and comparing the computed TCQI value with the threshold value T(FAR).

Again, if the TCQI exceeds the threshold value T(FAR) then a failure is declared and the corrections for the tested satellite (or a combination of tested satellites) are marked as invalid for further use in the user receiver differential solution.

Figure 8:
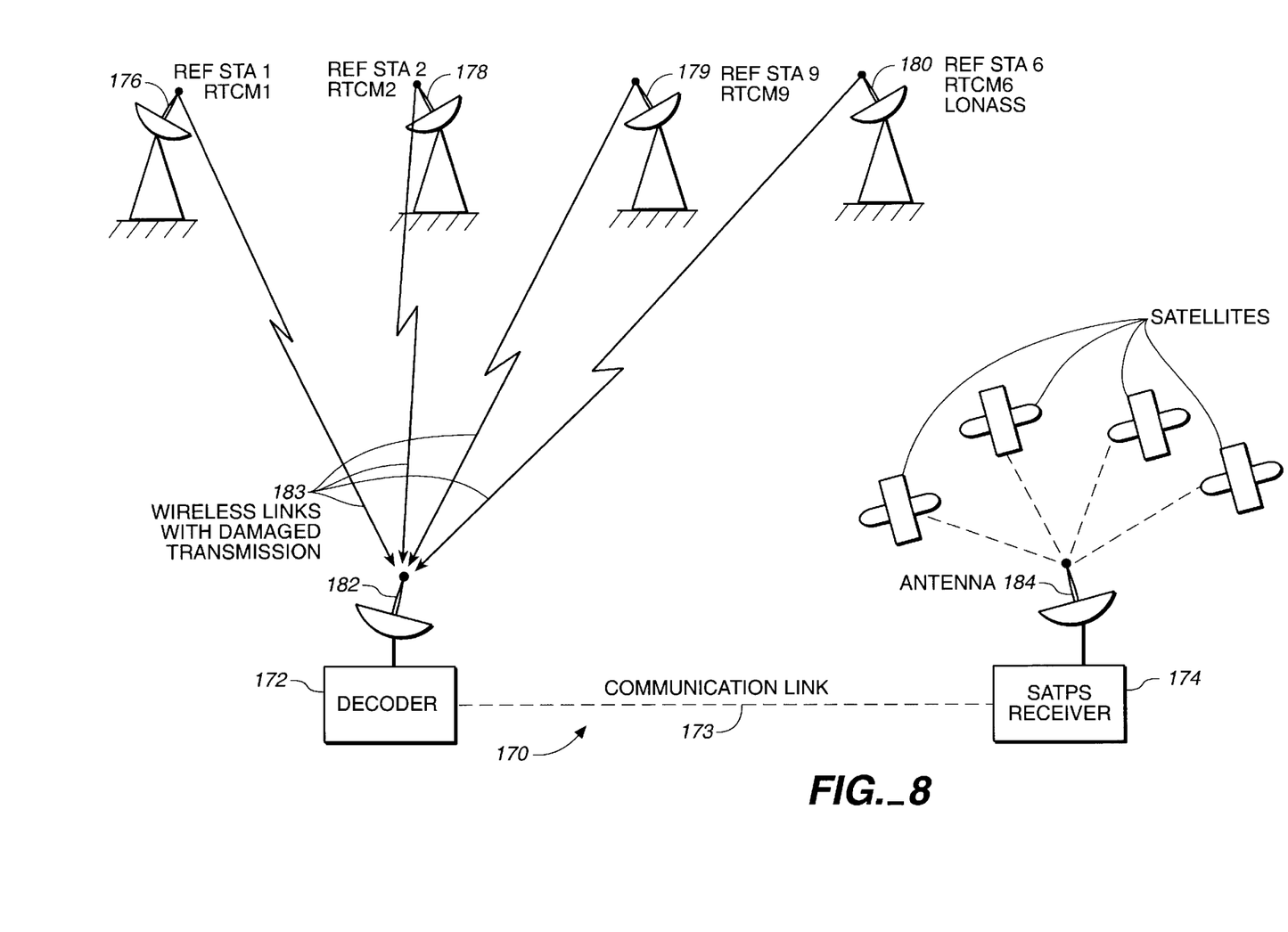
FIG. 8 shows a message decoder combined with a GPS receiver which is able to receive the differential corrections from multiple Reference Stations.
Figure 9:
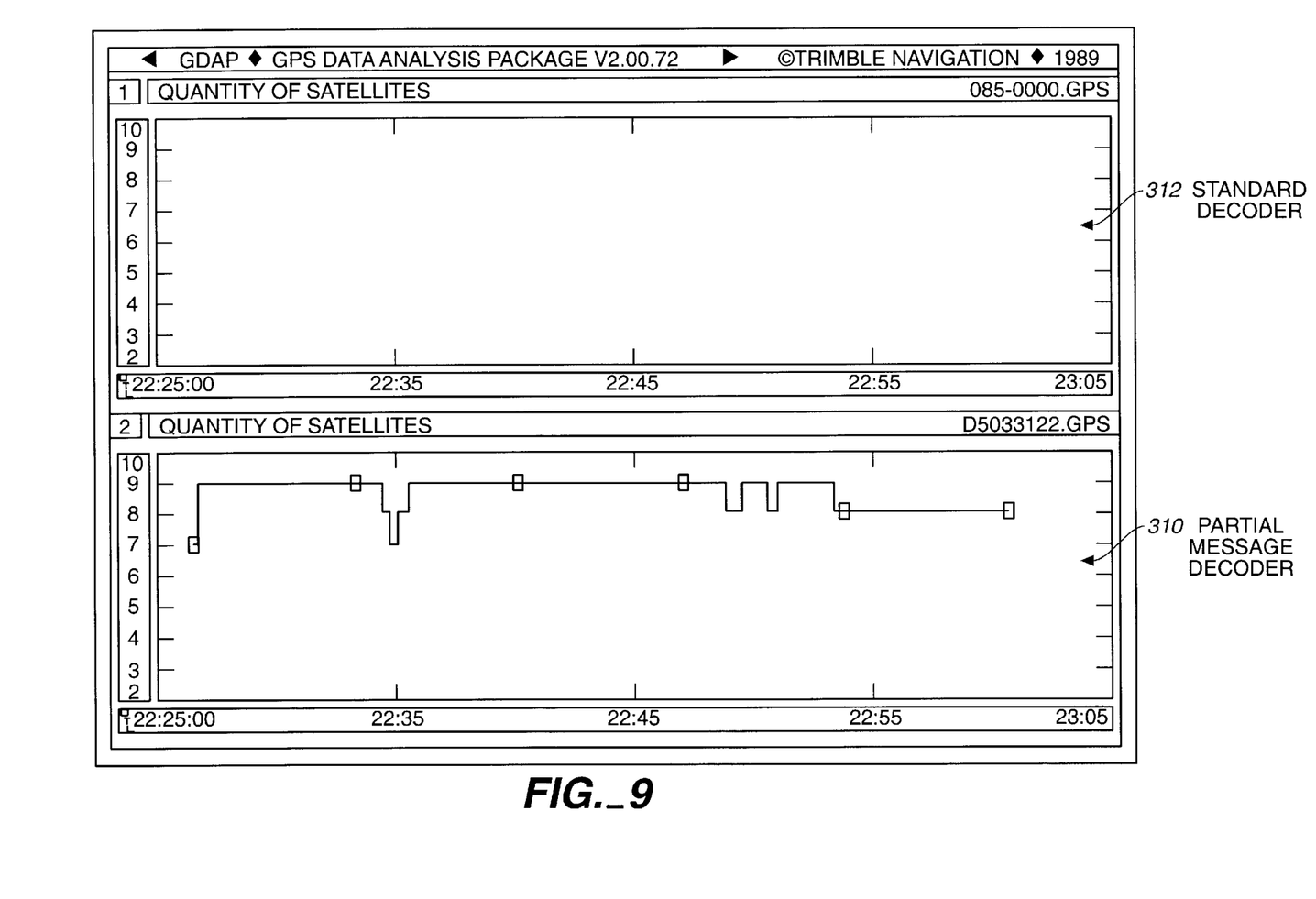
FIG. 9 shows the quantity of satellites used in the user receiver position fix.
Figure 10:
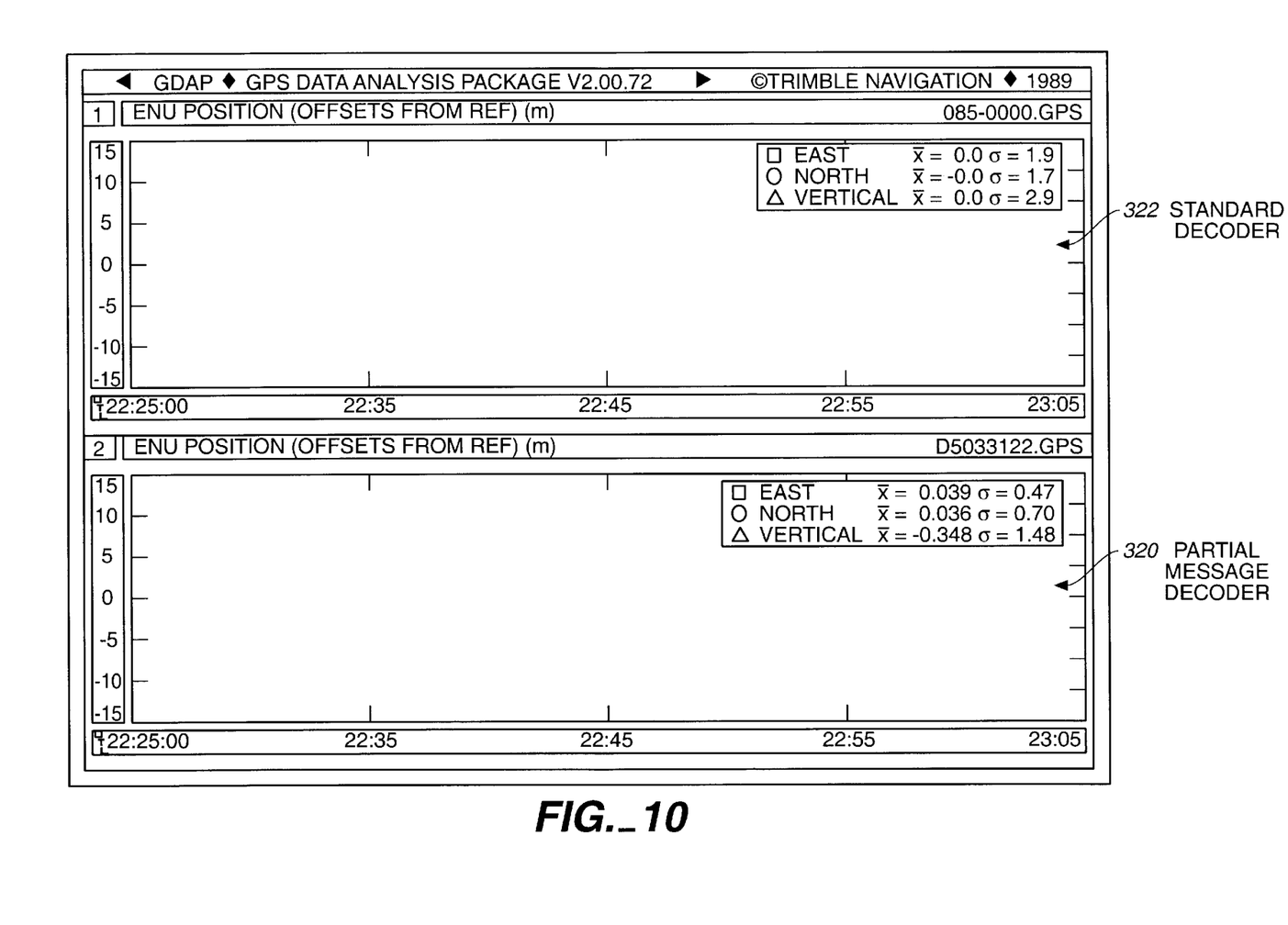
FIG. 10 illustrates the computed errors in the user position fix.

The simplest message decoder device combined with the SATPS receiver which can be used for the implementation of the partial decode algorithm disclosed in the parent patent application Ser. No. 08/435,552 is depicted in FIG. 8. The apparatus 170 is designed for partial decoding of the damaged messages transmitted for the differential mode of operation by a number of Reference Stations (RefSta) that transmit different messages like RTCM1 (176), RTCM2 (178), RTCM9 (179) and GLONASS RTCM (180). The device comprises at least one partial message decoder 172 for decoding the encoded data transmitted by different Reference Stations (RefSta). The apparatus (170) further comprises a differential satellite positioning system (SATPS) receiver 174 that receives the raw positioning data from at least one SATPS satellite and receives the decoded differential corrections from at least one partial message decoder 172. The apparatus (170) also includes at least one communication link 173 connecting at least one partial message decoder 172 and the SATPS receiver. The communication link 173 can include a wire link. The communication link 173 can be also a wireless link selected from the class of wireless communication links consisting of a cellular telephone, a radio, a satellite communication link, a wireless WAN/LAN station, or a wireless application services. The decoder 172 can be an integral part of the receiver 174.

The decoder 172 is to accept the encoded RTCM stream of data, decode this data, and output the differential data packets. The definition for the packet can be flexible as long as it includes the useful information. The decoder can pass the decoded RTCM information to the differential SATPS receiver that can use this data.

The description of the preferred embodiment of this invention is given for the purposes of explaining the principles thereof, and is not to be considered as limiting or restricting the invention since many modifications may be made by the exercise of skill in the art without departing from the scope of the invention.

What is claimed is:

1. A method of high level testing of differential corrections, said differential corrections being used in a GPS receiver for determining a differential solution to a navigational problem, said method comprising the steps of:

computing a Correction Quality Indicator $CQI=PRC_{r2}-[PRC_{r1}+RRC_{r1}*(t2-t1)]$; wherein a current pseudo range correction $PRC_{r2}$ is taken at a time t2; and wherein said time t2 is the Modified Z-Count of the current correction received for that satellite; and wherein the Modified Z-Count is defined as the time of the start of the frame as well as the reference time for the message parameters; and wherein the Modified Z-Count provides the time into the hour (0 through 3599.4 seconds) and is sent in units of 0.6 seconds; and wherein said previous pseudo range correction $PRC_{t1}$ taken at a time t1 is projected to a current time tag; and wherein said time t1 is synchronized with the Modified Z-Count for a current pseudorange correction (PRC) which was generated at t1; and comparing said computed CQI value with a threshold value T(FAR); wherein said threshold value T(FAR) is based on a false alarm rate and on a confidence interval;

and wherein if said CQI exceeds said threshold value T(FAR) said differential corrections are marked as invalid for further use in said GPS receiver differential solution.

2. The method of claim 1, wherein said step of computing said Correction Quality Indicator (CQI) further comprises the step of:

computing a Trimble Correction Quality Indicator $(TCQI)=PRC_{r2}-RRC_{r2}*(t2-t1)/2-[PRC_{r1}+RRC_{r1}*(t2-t1)/2]$;

wherein a current pseudo range correction $RRC_{r2}$ is interpolated to a time t3 within a time interval [t1, t2]; and wherein t1 is synchronized with the Modified Z-Count for a PRC which was generated at t1; and wherein t2 is the Modified Z-Count of the current correction received for that satellite.

* * * * *